US012199344B2

(12) United States Patent
Jung et al.

(10) Patent No.: US 12,199,344 B2
(45) Date of Patent: Jan. 14, 2025

(54) ANTENNA MODULE

(71) Applicant: AMOSENSE CO., LTD., Cheonan-si (KR)

(72) Inventors: Hongdae Jung, Cheonan-si (KR); Seho Lee, Cheonan-si (KR); Kyunghyun Ryu, Cheonan-si (KR); Hyungil Baek, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 259 days.

(21) Appl. No.: 17/778,099

(22) PCT Filed: Nov. 12, 2020

(86) PCT No.: PCT/KR2020/015878
§ 371 (c)(1),
(2) Date: May 19, 2022

(87) PCT Pub. No.: WO2021/107468
PCT Pub. Date: Jun. 3, 2021

(65) Prior Publication Data

US 2023/0026240 A1 Jan. 26, 2023

(30) Foreign Application Priority Data

Nov. 29, 2019 (KR) ........................ 10-2019-0156912

(51) Int. Cl.
*H01Q 5/30* (2015.01)
*H01Q 13/10* (2006.01)

(52) U.S. Cl.
CPC ............... *H01Q 13/10* (2013.01); *H01Q 5/30* (2015.01)

(58) Field of Classification Search
CPC .......... H01Q 13/10; H01Q 5/30; H01Q 5/364; H01Q 9/0421
See application file for complete search history.

(56) References Cited

U.S. PATENT DOCUMENTS 6,140,966 A * 10/2000 Pankinaho ............. H01Q 5/371 343/702
6,806,834 B2 * 10/2004 Yoon ...................... H01Q 5/371 343/702
(Continued)

FOREIGN PATENT DOCUMENTS

CN 101728639 A 6/2010
CN 106816713 A 6/2017
(Continued)

OTHER PUBLICATIONS

KR Office Action in Application No. 10-2019-0156912 dated Oct. 28, 2021.

*Primary Examiner* — Hai V Tran
*Assistant Examiner* — Bamidele A Immanuel
(74) *Attorney, Agent, or Firm* — Maschoff Brennan

(57) ABSTRACT

An antenna module is proposed in which a slit and a through-hole for grounding are additionally formed in a single radiator such that the antenna module resonates in two frequency bands or expands the bandwidth around a reference resonant frequency. The proposed antenna module includes a radiator having a first slit, and the radiator is divided into a first region and a second region with respect to the first slit, wherein a plurality of first through-holes and a second slit are formed in the first region, a second through-hole is formed in the second region, and a power feeding pattern is connected to a region between the first slit and the second slit in the first region.

6 Claims, 4 Drawing Sheets

(56) References Cited

U.S. PATENT DOCUMENTS

| | | | | |
|---|---|---|---|---|
| 7,170,456 | B2 * | 1/2007 | Kwak | H01Q 1/2283 343/702 |
| 8,094,084 | B2 * | 1/2012 | Kaneko | H01Q 1/42 343/793 |
| 8,917,216 | B2 * | 12/2014 | Miyoshi | H01Q 13/16 343/767 |
| 9,502,761 | B2 * | 11/2016 | Itoh | H01Q 9/0442 |
| 2002/0126052 | A1 * | 9/2002 | Boyle | H01Q 1/243 343/702 |
| 2003/0103010 | A1 * | 6/2003 | Boyle | H01Q 9/0442 343/702 |
| 2004/0080465 | A1 * | 4/2004 | Hendler | H01Q 9/36 343/700 MS |
| 2004/0239575 | A1 * | 12/2004 | Shoji | H01Q 13/10 343/702 |
| 2005/0128151 | A1 | 6/2005 | Kwak et al. | |
| 2006/0192713 | A1 | 8/2006 | Kwak et al. | |
| 2010/0188309 | A1 * | 7/2010 | Orime | H01Q 21/0075 343/848 |
| 2010/0214173 | A1 * | 8/2010 | Harihara | H01Q 9/42 343/700 MS |
| 2011/0043410 | A1 * | 2/2011 | Lee | H01Q 5/378 343/700 MS |
| 2014/0203987 | A1 | 7/2014 | Itoh et al. | |
| 2020/0153097 | A1 * | 5/2020 | Koshi | H01Q 13/10 |
| 2021/0005959 | A1 * | 1/2021 | Wu | H01Q 1/32 |
| 2021/0098871 | A1 * | 4/2021 | Yang | H01Q 21/30 |

FOREIGN PATENT DOCUMENTS

| | | | | | |
|---|---|---|---|---|---|
| CN | 110707426 | A | * | 6/2018 | H01Q 1/38 |
| CN | 108987911 | B | * | 10/2019 | H01Q 1/38 |
| CN | 113725622 | A | * | 7/2021 | H01Q 13/10 |
| KR | 10-2004-0004285 | A | | 1/2004 | |
| KR | 10-2006-0094603 | A | | 8/2006 | |

* cited by examiner

[FIG. 1]
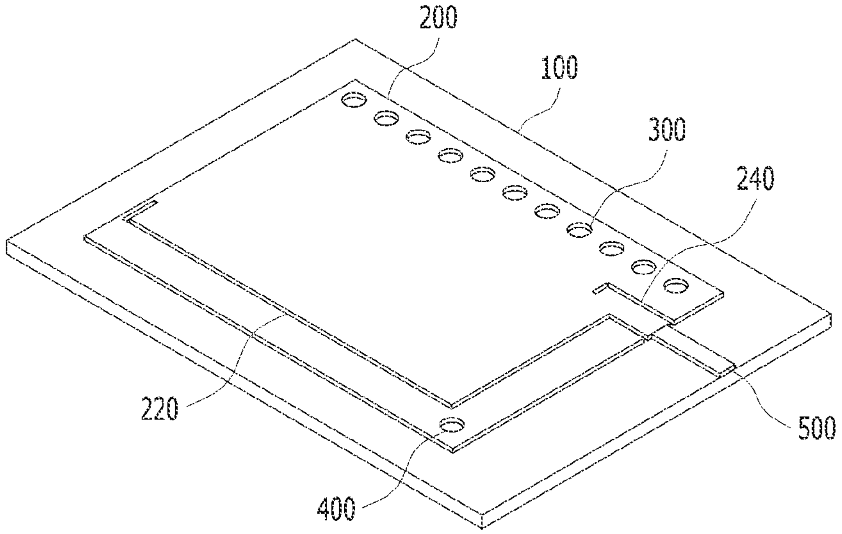

[FIG. 2]
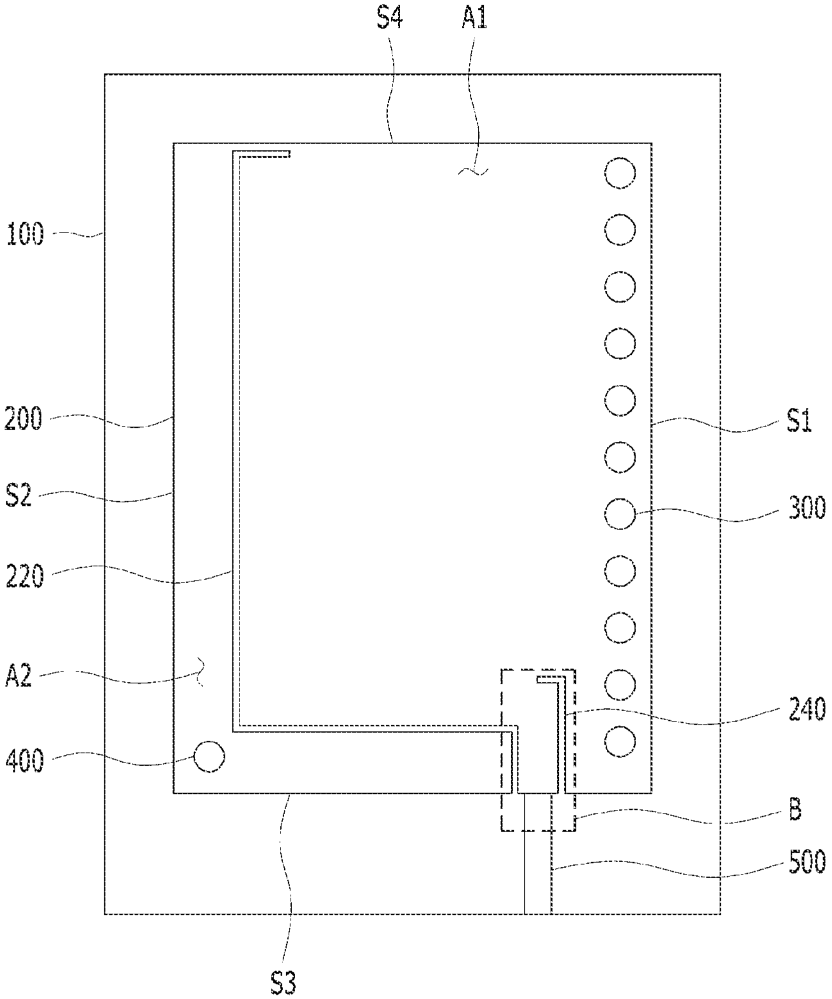

[FIG. 3]
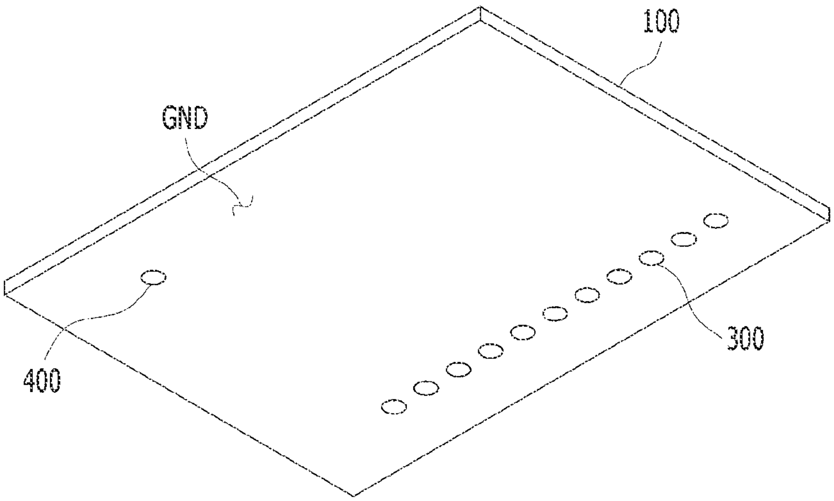
[FIG. 4]
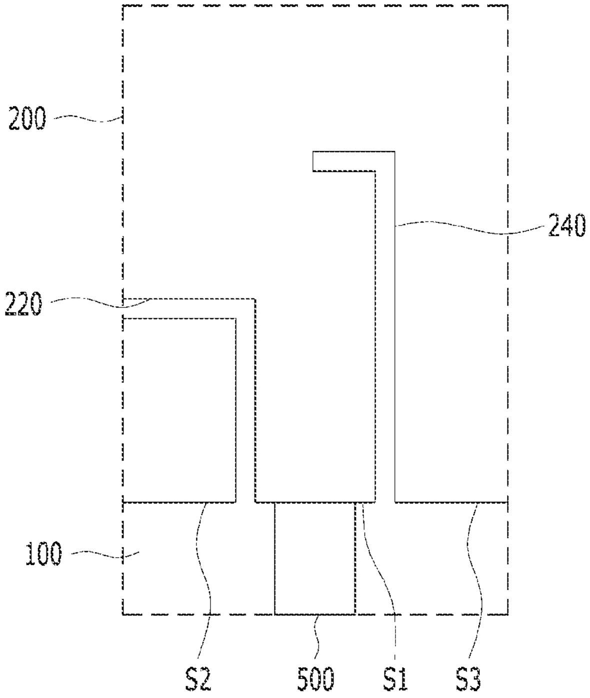

[FIG. 5]
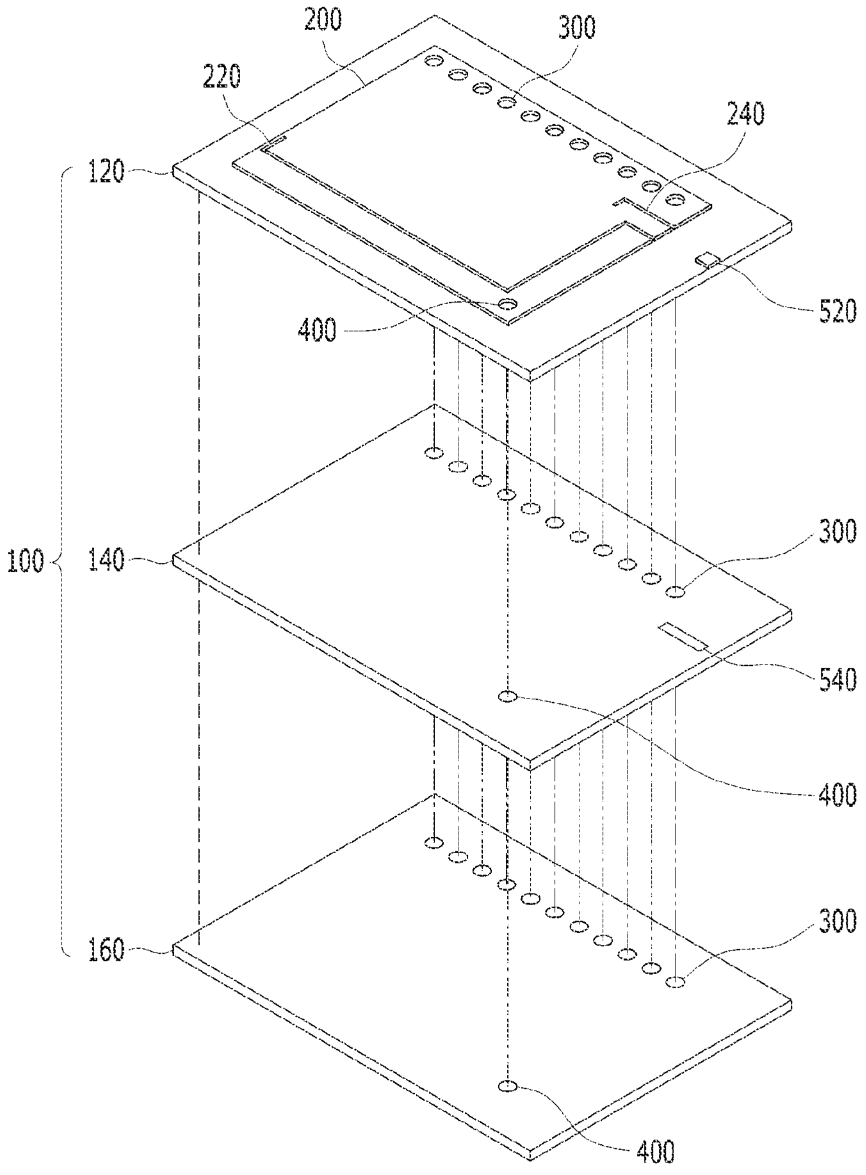

ANTENNA MODULE

TECHNICAL FIELD

The present disclosure relates to an antenna module.

BACKGROUND ART

In general, a dual band antenna that resonates in two frequency bands is configured to include two radiators. In other words, the dual band antenna includes an antenna that resonates in a first frequency band with one radiator, and an antenna that resonates in a second frequency band with the other radiator.

However, there is a problem in that since the dual band antenna requires two radiators, a mounting space increases, and it is difficult to expand a bandwidth more than a certain amount due to the interference between the two radiators.

SUMMARY OF INVENTION

Technical Problem

The present disclosure has been proposed to solve the above conventional problem, and an object of the present disclosure is to provide an antenna module, which additionally forms a slit and a through-hole for ground in one radiator to resonate in two frequency bands or expand a bandwidth around a reference resonant frequency.

Solution to Problem

In order to achieve the object, according to an embodiment of the present disclosure, there is provided an antenna module including: a base substrate, a radiator disposed on an upper surface of the base substrate, a first through-hole formed by passing through the base substrate and the radiator, and disposed adjacent to a first side of the radiator, and a second through-hole formed by passing through the base substrate and the radiator, and disposed adjacent to a second side of the radiator facing the first side, in which the radiator is formed with a first slit formed to extend into the radiator starting from a third side of the radiator adjacent to the first side and the second side.

At this time, the radiator may be divided into a first region that is a region between the first side of the radiator and the first slit and a second region that is a region between the second side of the radiator and the first slit.

The radiator may be further formed with a second slit disposed between the first side of the radiator and the first slit, the second slit may be formed to extend into the radiator starting from the third side of the radiator, and the second slit may be spaced apart from the first slit and disposed in the first region.

Meanwhile, the antenna module may further include a power feeding pattern disposed on the base substrate, and connected to the first region of the radiator. The power feeding pattern may be connected to a region between the first slit and the second slit in the first region of the radiator.

A plurality of first through-holes disposed in parallel with the first side of the radiator in the first region, and connected to a ground pattern formed on a lower surface of the base substrate may be provided, and the second through-hole may be disposed in the second region of the base substrate, and connected to a ground pattern formed on a lower surface of the base substrate.

The first region of the radiator may receive a signal of a first frequency band, and the second region of the radiator may receive a signal of a second frequency band.

A length of the first slit may be differently formed corresponding to a frequency interval between a reference resonant frequency and an additional resonant frequency, and the length of the first slit may be differently formed corresponding to a bandwidth of a resonant frequency.

Advantageous Effects of Invention

According to the present disclosure, the antenna module can expand the bandwidth of the reference resonant frequency or form the dual band by forming two resonant frequencies within the proposed region (i.e., radiator).

In addition, the antenna module can vary the length of the first slit formed in the radiator to adjust the interval between the reference resonant frequency and the additional resonant frequency.

BRIEF DESCRIPTION OF DRAWINGS

FIG. 1 is a perspective view of an antenna module according to an embodiment of the present disclosure.

FIG. 2 is a top view of the antenna module according to an embodiment of the present disclosure.

FIG. 3 is a bottom view of the antenna module according to an embodiment of the present disclosure.

FIG. 4 is an enlarged view of region B in FIG. 2 in order to describe a power feeding pattern in FIG. 1.

FIG. 5 is a view for describing the power feeding pattern in FIG. 1.

DESCRIPTION OF EMBODIMENTS

Hereinafter, the most preferred embodiments of the present disclosure will be described with reference to the accompanying drawings in order to specifically describe the embodiments so that those skilled in the art to which the present disclosure pertains can easily implement the technical spirit of the present disclosure. First, in adding reference numerals to the components of each drawing, it should be noted that the same components have the same reference numerals as much as possible even if they are illustrated in different drawings. In addition, in describing the present disclosure, when it is determined that the detailed description of the related well-known configuration or function can obscure the gist of the present disclosure, the detailed description thereof will be omitted.

Referring to FIGS. 1 to 3, an antenna module according to an embodiment of the present disclosure is configured to include a base substrate 100, a radiator 200, a first through-hole 300, a second through-hole 400, and a power feeding pattern 500.

The base substrate 100 is a plate-shaped substrate having flexibility. The base substrate 100 is made of polyimide generally used in a flexible printed circuit board (FPCB). For example, the base substrate 100 is formed in a rectangular shape.

A lower surface of the base material 100 is configured as a ground GND. In other words, for example, a ground layer made of copper material is formed on the lower surface of the base substrate 100. At this time, the ground GND is formed on the entire lower surface of the base substrate 100. Of course, the ground GND may also be formed on a part of the lower surface of the base substrate 100, and may be formed to have a region that at least overlaps a plurality of first through-holes 300 and second through-holes 400.

The radiator 200 is disposed on an upper surface of the base substrate 100. For example, the radiator 200 is formed in a rectangular shape having a first side S1, a second side S2, a third side S3, and a fourth side S4, and may be formed in various shapes such as a semicircular shape and an oval shape.

A first slit 220 and a second slit 240 are formed in the radiator 200. At this time, the radiator 200 is divided into a first region A1, which is a region between the first side S1 and the first slit 220, and a second region A2, which is a region between the second side S2 and the first slit 220.

The first slit 220 is formed to extend into the radiator 200 starting from the third side S3 of the radiator 200 adjacent to the first side S1 and the second side S2 of the radiator 200. The first slit 220 is open in a portion that comes into contact with the third side S3 of the radiator 200.

The second slit 240 is formed to extend into the radiator 200 starting from the third side S3 of the radiator 200 and disposed between the first side S1 and the first slit 220 of the radiator 200. The second slit 240 is spaced apart from the first slit 220 and disposed in the first region A1 of the radiator 200, and is open in a portion that comes into contact with the third side S3 of the radiator 200.

The first through-hole 300 is formed by passing through the base substrate 100 and the radiator 200. The first through-hole 300 is connected to a ground pattern formed on the lower surface of the base substrate 100. At this time, the first through-hole 300 is disposed adjacent to the first side S1 of the radiator 200 and disposed in the first region A1 of the radiator 200. A plurality of first through-holes 300 are configured and disposed in parallel with the first side S1 of the radiator 200 in the first region A1.

The second through-hole 400 is formed by passing through the base substrate 100 and the radiator 200. The second through-hole 400 is connected to the ground pattern formed on the lower surface of the base substrate 100. At this time, the second through-hole 400 is disposed adjacent to the second side S2 of the radiator 200 that is opposite to the first side S1 of the radiator 200, and disposed in the second region A2 of the radiator 200.

The power feeding pattern 500 is disposed on the base substrate 100 and connected to the radiator 200. The power feeding pattern 500 is a pattern for connecting the radiator 200 to a power feeding source (not shown), and is electrically connected to the radiator 200. The power feeding pattern 500 is connected to the first region A1 of the radiator 200. At this time, referring to FIG. 4, the power feeding pattern 500 is connected to a region between the first slit 220 and the second slit 240 in the first region A1 of the radiator 200.

Meanwhile, referring to FIG. 5, the power feeding pattern 500 may be configured to include a first power feeding pattern 520 electrically connected to the power feeding source, and a second power feeding pattern 540 electrically connected to the first power feeding pattern 520 and the radiator 200.

At this time, assuming that the antenna module is composed of a stacked antenna in which a first base substrate 120, a second base substrate 140, and a third base substrate 160 are stacked, the first power feeding pattern 520 is disposed on an upper surface of the first base substrate 120 and electrically connected to the power feeding source.

The second power feeding pattern 540 is disposed on the upper surface of the first base substrate 120. One end of the second power feeding pattern 540 is electrically connected to the first power feeding pattern 520 through a via hole (not shown). The other end of the second power feeding pattern 540 is electrically connected to the radiator 200 through a via hole (not shown). At this time, the other end of the second power feeding pattern 540 is electrically connected to a region between the first slit 220 and the second slit 240 in the first region A1 of the radiator 200.

According to the above-described structure, the radiator 200 may be electrically connected to the power feeding pattern 500 and the plurality of first through-holes 300 to configure an antenna in the form of a planar inverted F antenna (PIFA) that resonates in a reference frequency band.

In addition, the radiator 200 may be connected to the power feeding pattern 500 and the second through-hole 400 to configure an antenna in the form of a PIFA that resonates in an additional frequency band.

As described above, the antenna module according to an embodiment of the present disclosure adds the second through-hole 400 connected to the first slit 220 and the ground to one radiator connected to the ground through the plurality of first through-holes 300 to have the reference resonant frequency, and thus induces a change in a current path to have an additional resonant frequency.

Accordingly, the antenna module according to an embodiment of the present disclosure may operate as the dual band antenna having the reference resonant frequency and the additional resonant frequency, or increase the bandwidth of the reference resonant frequency through the reference resonant frequency and the additional resonant frequency.

Meanwhile, referring to FIG. 5, the antenna module according to an embodiment of the present disclosure may be formed to vary the length of the first slit 220 according to an interval between the reference resonant frequency required and the additional resonant frequency. At this time, adjusting the interval between the reference resonant frequency and the additional resonant frequency may also be understood as adjusting the bandwidth of the reference resonant frequency.

In addition, the antenna module according to an embodiment of the present disclosure may match the impedance between the reference resonant frequency and the additional resonant frequency by adjusting the length of the second slit 240.

As described above, the antenna module according to an embodiment of the present disclosure may expand the bandwidth of the reference resonant frequency or form the dual band by forming two resonant frequencies within the proposed region (i.e., radiator 200).

Although the preferred embodiments of the present disclosure have been described above, it is understood that the present disclosure can be modified in various forms, and those skilled in the art can practice various modified examples and changed examples without departing from the scope of the claims of the present disclosure.

The invention claimed is:

1. An antenna module comprising:

a base substrate;

a radiator disposed on an upper surface of the base substrate;

a plurality of first through-holes formed by passing through the base substrate and the radiator, and disposed adjacent to a first side of the radiator; and a second through-hole formed by passing through the base substrate and the radiator, and disposed adjacent to a second side of the radiator facing the first side, wherein the radiator is formed with a first slit formed to extend into the radiator starting from a third side of the radiator adjacent to the first side and the second side, and a second slit formed to extend into the radiator starting from the third side of the radiator to dispose between the first side of the radiator and the first slit, wherein the radiator is divided into a first region and a second region, the first region is a region between the first side of the radiator and the first slit, and the second region is a region between the second side of the radiator and the first slit, and wherein the plurality of first through-holes are disposed in parallel with the first side of the radiator in the first region.

2. The antenna module of claim 1, wherein the second slit is spaced apart from the first slit and disposed in the first region.

3. The antenna module of claim 1, further comprising: a power feeding pattern disposed on the base substrate and connected to the first region of the radiator.

4. The antenna module of claim 3, wherein the power feeding pattern is connected to a region between the first slit and the second slit in the first region of the radiator.

5. The antenna module of claim 1, wherein the plurality of first through-holes are connected to a ground pattern formed on a lower surface of the base substrate.

6. The antenna module of claim 1, wherein the second through-hole is disposed in the second region of the base substrate and connected to a ground pattern formed on a lower surface of the base substrate.

* * * * *